Oct. 30, 1956  M. ROGOFF  2,769,121
ELECTRICAL INSTRUMENTS
Filed Aug. 13, 1953  2 Sheets-Sheet 1
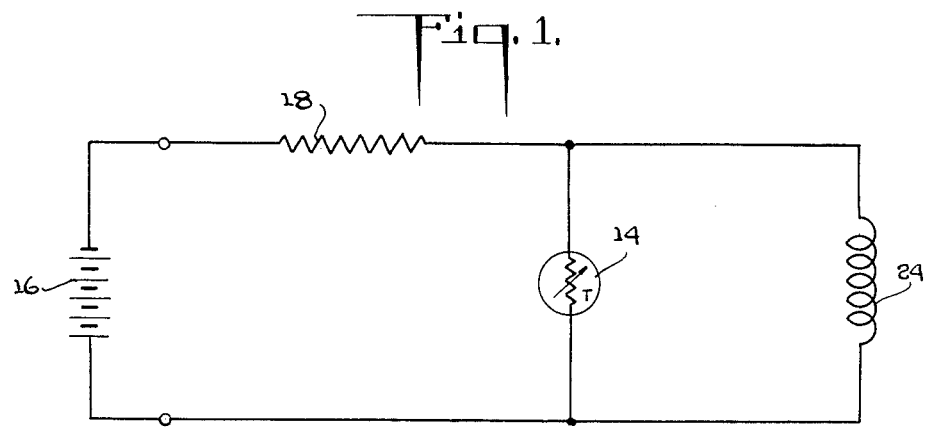
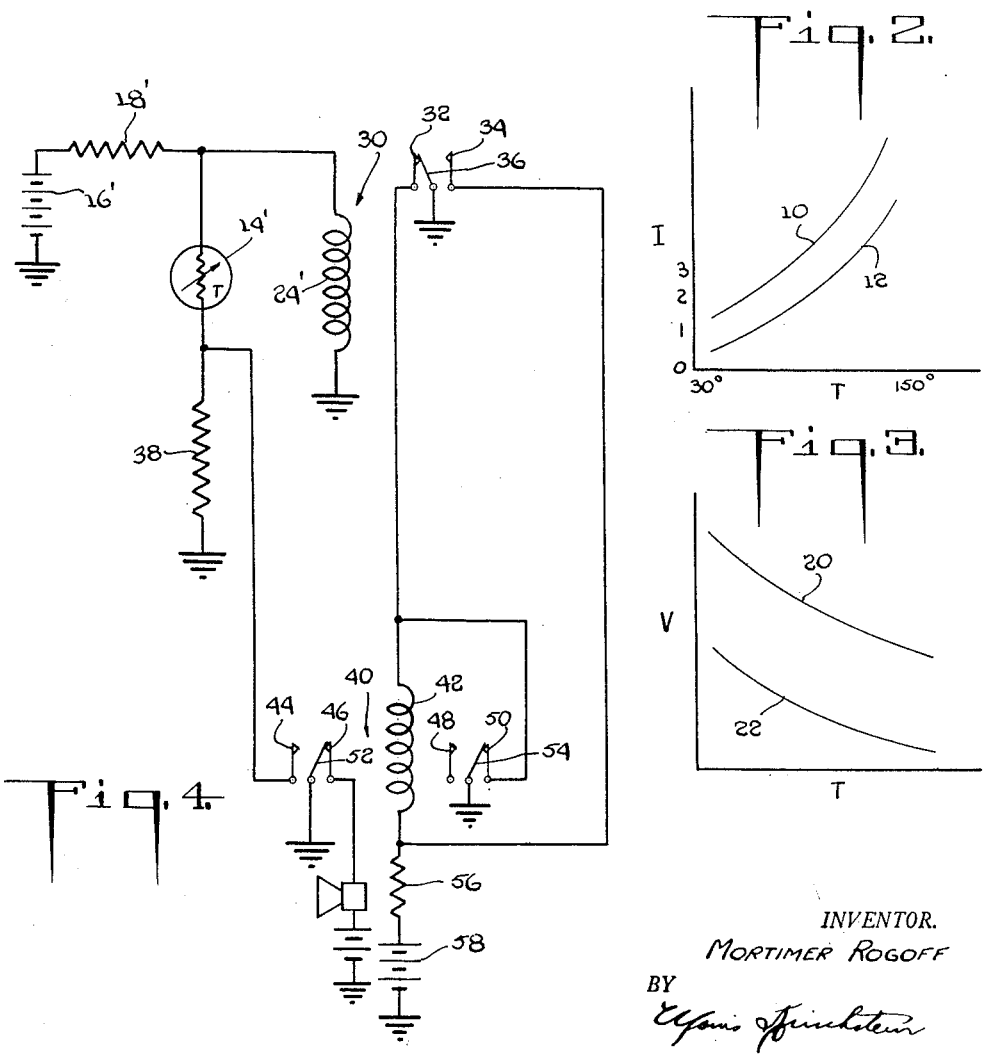
INVENTOR.
MORTIMER ROGOFF
BY
ATTORNEY Oct. 30, 1956  M. ROGOFF  2,769,121
ELECTRICAL INSTRUMENTS
Filed Aug. 13, 1953  2 Sheets-Sheet 2
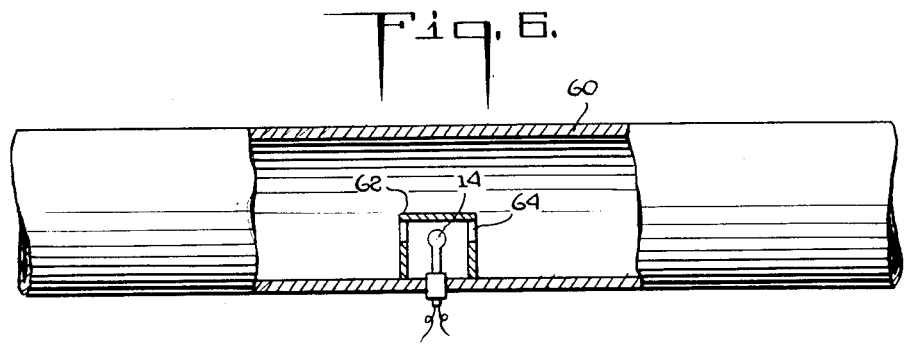
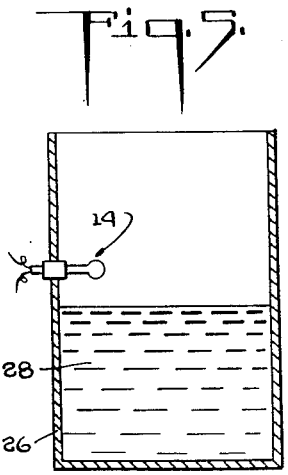
INVENTOR.
MORTIMER ROGOFF
BY
ATTORNEY United States Patent Office 2,769,121
Patented Oct. 30, 1956

2,769,121

ELECTRICAL INSTRUMENTS

Mortimer Rogoff, Nutley, N. J., assignor to McDermott Controls, Inc., East Orange, N. J., a corporation of New Jersey Application August 13, 1953, Serial No. 374,091

7 Claims. (Cl. 317—132)

This invention relates to electrical instruments. More particularly my invention pertains to an electrical instrument which is sensitive to ambient fluid media. Still more specifically, my invention is concerned with an electrical instrument which can detect a change in the state of an ambient fluid media as, for example, between gaseous and liquid and between stationary and moving.

Mechanical instrumentalities are accurate indicators and reliable measuring devices for the purposes above indicated, such for example as for water level indicators and flow meters. However, they are bulky, expensive, difficult to service and hard to telemeter. It has been proposed to employ electrical instrumentalities for these purposes. Their desirability is readily apparent, but the suggested electrical devices have been so temperature sensitive that, unless the fluid media which is being gauged is at a substantially constant temperature, the electrical devices are unreliable. That is to say, the fluctuation in the electric condition supplied to an external circuit for indication or measurement has been so highly responsive to temperature variations that it over-rides fluctuations due to the difference in the specific condition to which the instrument is supposed to be responsive.

It is an object of my present invention to provide an electrical instrument of the character described which is not subject to the foregoing defects.

Another object of my invention is to provide an electrical instrument of the character described which is comparatively insensitive to temperature fluctuations over a wide range.

Another object of my invention is to provide an electrical instrument of small, simple and highly compact form which will supply to an external electrical circuit an electric condition which fluctuates principally with change in ambient fluid state rather than ambient fluid temperature.

It is an additional object of my invention to provide an electrical instrument of the character described which will act as a highly efficient and reliable liquid or gaseous sensing means.

It is another object of my invention to provide an electrical instrument of the character described which will act as a highly efficient and reliable flow-no-flow instrument.

It is an ancillary object of my invention to provide an electrical instrument of the character described which constitutes relatively few parts and is easy and inexpensive to make and maintain.

Other objects of my invention in part will be obvious and in part will be pointed out hereinafter.

My invention accordingly consists in the features of construction, combinations of element and circuits which will be exemplified in the instruments hereinafter described and of which the scope of application will be indicated in the appended claims.

In the accompanying drawings in which are shown various possible embodiments of my invention, Fig. 1 is an electrical circuit showing the basic elements of an electrical instrument embodying my invention;

Fig. 2 is a graph illustrating thermistor current as a function of ambient fluid temperature in a typical electrical instrument not made in accordance with the present invention;

Fig. 3 is a graph illustrating the thermistor voltage as a function of ambient fluid temperature in the instrument whose circuit is shown in Fig. 1;

Fig. 4 is an electrical circuit of an instrument embodying a modified form of my invention;

Fig. 5 is a vertical sectional view through a fluid container having mounted thereon a sensing element which is adapted to be used in the circuit of either Fig. 1 or Fig. 4; and Fig. 6 is a side partially broken-away view of a fluid conduit having mounted thereon a sensing element which is adapted to be used in the circuit of either Fig. 1 or Fig. 4.

In general, I carry out my invention with the aid of a thermistor which is located physically in the fluid and is so connected electrically that a substantially constant current flows through the same, the thermistor being so arranged circuitwise that the voltage drop across it controls a voltage sensitive device. As is well known, a thermistor is an electrical resistance which is highly sensitive to changes in temperature, i. e., has a very large temperature coefficient of resistance, the coefficient being negative so that, as the temperature of the thermistor goes up its resistance goes down, and vice versa.

If the thermistor is connected across a constant voltage source of electric energy, such for example as a battery and is located physically in a container having a varying level of liquid so that at times the thermistor is exposed to air, the relationship of the thermistor current to the ambient fluid temperature will be as shown in Fig. 2 wherein the curve 10 is for the thermistor in air and the curve 12 is for the thermistor in liquid. The values on the temperatures abscissa are in degrees Fahrenheit and the values on the current ordinate are in milliamperes. From the curves 10, 12, it will be apparent that the thermistor current rises as the temperature of the ambient fluid media increases. This is due to the fact that when the ambient temperature rises the thermistor temperature rises so that the thermistor resistance falls and the thermistor current increases.

In general, the temperature of the thermistor in liquid of any given temperature will be lower than the temperature of the thermistor in air at the same air temperature inasmuch as the liquid is a better conductor of heat and will tend to keep down the thermistor temperature, it being understood that electrical instruments of the type under consideration are designed to operate at thermistor temperatures considerably higher than the temperature of the ambient fluid media. Hence, when the ambient fluid media is changed from liquid to gas, the temperature of the thermistor will rise, its resistance will fall and more current will flow through it. Thus if the temperature of the ambient fluid media remains constant, a change in current through the thermistor will furnish an indication that the media surrounding the thermistor has been changed from gas to liquid, or vice versa. A high current flow will indicate that the thermistor is in air and a low current flow that the thermistor is in liquid.

When the ambient temperature fluctuates, since the thermistor is highly sensitive to temperature, there is, as indicated in the curves 10, 12, a corresponding marked variation of the thermistor current. Consequently, for any given reading of thermistor current there will be a value on curve 10 at a certain air temperature and another value on curve 12 at a different liquid temperature which is not far removed from said air temperature. When the thermistor is used to control a signalling device, as for example a meter, horn, light, relay, etc., energization of the device may be due either to a change in the state of the ambient fluid or to a change in temperature of the ambient fluid not accompanied by a change in state. To prevent a change in temperature from energizing the device controlled by the thermistor, it is necessary for the thermistor to be used in a very narrow temperature range. In practice, this is in the order of 15° F. Accordingly, it will be appreciated that the thermistor cannot be utilized where there is a wide variation in ambient temperature.

The present invention avoids this difficulty in the manner noted above, to wit, by having a substantially constant current flow through the thermistor. The simplest form of circuit for achieving such result is illustrated in Fig. 1 wherein the reference numeral 14 denotes a conventional thermistor. Said thermistor is connected in series with a constant source of voltage, such as a battery 16, and a fixed resistance 18. The resistance 18 has an ohmic value which is large in comparison with the ohmic value of the thermistor over the temperature range employed, that is to say, the ohmic value of the resistance 18 is in excess of the ohmic value of the thermistor at all working temperatures. By way of example and without limiting myself thereto, typical values for the foregoing elements of the circuit are 110 volts for the battery 16, 5,000 ohms for the fixed resistance 18 and 625 ohms for the thermistor when immersed in water at 70° F. and connected in said circuit. It will be understood that the internal thermistor temperature corresponding to 625 ohms is not 70° F. inasmuch as heat is being developed in the thermistor by current passing through it.

Because the fixed resistance 18 is substantially greater than the thermistor resistance, the variation in thermistor resistance does not greatly affect the current flowing through the circuit so that the current is substantially constant, i. e., substantially independent of any resistance changes in the thermistor due to temperature changes over the operating range. Hence the power dissipated in the thermistor is inversely proportional to the thermistor temperature. This is best demonstrated by the following equations:

According to Ohm's law $$E = I \cdot R$$
$$P = E \cdot I = I^2 \cdot R$$

where P is power.

In a thermistor the resistance lowers as the thermistor temperature rises and vice versa, that is to say, a thermistor has a negative coefficient of resistance, the resistance being inversely proportional to the thermistor temperature.

Hence $$R = \frac{K}{T} \text{ (approximately)}$$

where R is the resistance of the thermistor.

$$\therefore P = K \cdot \frac{I^2}{T}$$

But $I = K'$ (approximately) because in the circuit under discussion the large fixed resistance maintains the current substantially constant.

Accordingly $$P = \frac{K''}{T}$$

This arrangement effects a thermal compensation which overcomes the difficulty above noted that is encountered when the thermistor is connected so as to be subjected to a constant voltage.

In Fig. 3, I have shown the voltage-temperature curves of a thermistor connected in a circuit such as shown in Fig. 1. The reference numeral 20 denotes the liquid curve and the reference numeral 22 the gas curve. The abscissa and ordinate are drawn to the same scales as those in Fig. 2. It will be seen that the curves of Fig. 3 are substantially flatter than those of Fig. 2 so that now over a wide range of temperatures any given value of voltage will denote a certain condition of ambient fluid media. There no longer is the possibility that, within this wide temperature range, a certain voltage value can denote two states of the fluid at different temperatures.

The necessity for temperature compensation which creates the difficulty noted in the description of Fig. 2 arises from the fact that the thermistor is a thermal responsive device and yet it is used to detect the presence of liquid by a change in internal temperature consequent upon the rate of heat conduction from the thermistor to the ambient fluid media. This rate of heat conduction is higher with liquid media than gaseous. The flow of heat drops the internal temperature of the thermistor thereby raising its resistance, which is measured by the external circuit. However, a change in the temperature of the media also will change the thermistor resistance so that a given thermistor resistance might indicate either that the thermistor is in a liquid medium of a certain temperature or in a gaseous medium of a lower temperature. This difficulty can be avoided by keeping an approximately constant difference between the internal thermistor temperature and the temperature of the ambient media as the temperature of the media changes. I have accomplished this, as indicated above, by having a constant current fed to the thermistor rather than a constant voltage inasmuch as with constant current a drop in temperature increases the thermistor resistance and thereby increases the internal thermistor heat so as to offset the increased outflow of heat at lower ambient temperatures. The tendency thus is to make the thermistor independent of ambient temperature.

Reverting now to Fig. 1, an instrument embodying my invention includes means sensitive to the voltage across the thermistor. For example, such means may constitute the coil 24 of a relay whose contacts are not illustrated. The coil has a comparatively high resistance, i. e. higher than that of the maximum resistance of the thermistor under the expected working conditions. For example, coil 24 may have a resistance in the order of 5,000 ohms. The relay, of which coil 24 is the actuating means, is a voltage responsive device and is set to change from one state to another when the voltage across the thermistor changes upon a change in state of the ambient fluid media. By way of example, a typical thermistor, with the values in the circuit of Fig. 1 given above, can be selected to provide a voltage drop of 12.2 volts at a liquid temperature of 40° F. and a voltage drop of 5.9 volts at 140° F. The same thermistor will have a voltage drop of 4.6 volts at an air temperature of 40° F. and 3.25 volts at an air temperature of 140° F. Hence, if the relay of which coil 24 is the actuating means is adjusted to close at slightly less than 5.9 volts, e. g. 5.5 volts, and to open at slightly more than 4.6 volts, e. g. 5 volts, when the relay is closed it will be an indication that the thermistor is liquid-immersed, and when it is open it will be an indication that the thermistor is exposed to air.

In Fig. 5 I have shown a container 26 in which a liquid 28 is disposed. The thermistor 14 is mounted on a side wall of the container with the lead lines therefrom running to the battery 16, the fixed resistance 18 and the actuating coil 24 of the voltage sensitive device. As noted above, the rise in the level of the liquid will submerge the thermistor, reduce its temperature, raise its resistance and actuate, i. e. close, the voltage sensitive device. As soon as the liquid level drops below the thermistor, the reverse action takes place and the voltage sensitive device is opened.

To reduce the tendency of the voltage sensitive device to oscillate, the modified circuit shown in Fig. 4 may be employed. Parts in the circuit which are the same as parts in the circuit of Fig. 1 will be denoted by the same reference numerals primed. One end of a thermistor 14' is connected to an end of a high fixed resistance 18' the other end of which is connected to the positive terminal of a battery 16'. The negative terminal of the battery is grounded. The junction point between the thermistor and high resistance is connected to an actuating coil 24' of a relay 30 which constitutes a voltage sensitive device. Said relay includes a pair of fixed contacts 32, 34 and a movable contact 36 controlled by the coil 24'. The movable contact normally (when the relay is idle) engages the stationary contact 32. Said movable contact is grounded. The other end of the thermistor is connected through a fixed resistance 38, in the order of 100 ohms, for example, to ground.

The instrument whose circuit is shown in Fig. 4 further includes a secondary relay 40 having an actuating coil 42, a first pair of fixed contacts 44, 46 and a second pair of fixed contacts 48, 50. Associated with the fixed contacts 44, 46, is a movable contact 52 and associated with the fixed contacts 48, 50 is a movable contact 54. Both movable contacts are controlled by the coil 42. When the coil 42 is idle, the movable contacts 52, 54 engage the stationary contacts 44, 48, respectively. The junction point between the thermistor and resistance 38 is connected to the fixed contact 44. Both movable contacts 52, 54 are grounded. The fixed contact 32 is connected to one end of the coil 42 and also to the fixed contact 50. The fixed contact 34 is connected to the other end of the coil 42 and also through a current limiting resistance 56 to the positive terminal of an auxiliary battery 58 whose negative terminal is grounded.

When the thermistor is immersed in liquid and its resistance, therefore, is comparatively high inasmuch as its temperature is reduced by the outflow of heat into the thermally conductive liquid, the relay 30 will be energized by the battery 16' inasmuch as at this time the battery is directly across the thermistor 14' and high fixed resistance 18' in series. It will be observed that at such time the resistance 38 is shunted by the closed contacts 44, 52. Likewise at such time the contact 36 engages the contact 34 so that the secondary relay 40 is idle.

When the liquid level drops and the thermistor is exposed to air, its temperature rises and its resistance drops. Since resistance 18' causes a substantially constant current to flow through the thermistor 14', the voltage across the thermistor will drop and, with it, the voltage across the coil 24', causing relay 30 to be de-energized. When said relay 30 is fully de-energized, the contacts 32, 36 will engage thereby energizing the secondary relay 40. Energization of the secondary relay removes the shunt across the resistance 38 so that the thermistor now is in series with resistance 38 as well as resistance 18' and the coil 24' is in parallel with thermistor 14' and resistance 38. When the secondary relay is energized, it locks itself in a closed position by causing engagement of contacts 50, 54.

When the thermistor is reimmersed, its resistance will increase and the relay 30 again will be energized. When said relay is fully energized, it will close the contacts 34, 36 thereby shunting out the coil 42 and de-energizing the relay 40. As the relay de-energizes, contacts 44, 52 will re-close to shunt out resistance 38 and reduce the voltage supplied to the actuating coil 24'. It thus will be apparent that there will be a greater spread between the opening and closing voltages for the relay 30 and there will be less tendency for said relay to oscillate. The relay 40 may control a suitable signalling device such as a horn or light 59.

In Fig. 6 I have shown the thermistor 14 used as part of flow-no-flow instrument. Said thermistor is mounted to extend into a conduit 60. If desired, the thermistor can be protected by a cage 62 which, however, is provided with openings 64 to permit moving fluid in the conduit to flow over the thermistor. If the fluid in the conduit is stationary, the thermistor will lose heat to the ambient medium at a certain rate. However, if the fluid is moving at a certain speed, the thermistor will lose heat to the ambient medium at a predetermined faster rate. Hence, when the medium is stationary, the temperature of the thermistor is higher and its resistance lower than when the medium is flowing. By use of the circuit shown in Fig. 1 or the circuit shown in Fig. 4, the change in resistance can be employed to control a voltage sensitive device. It will be appreciated that, although the flow-no-flow instrument is actuated by a thermistor, which is a temperature sensitive mechanism, and although the instrument operates upon the principle that the temperature of the thermistor changes for indicating purposes, the instrument nevertheless is comparatively insensitive to fluctuations in temperature in the ambient medium.

It thus will be seen that I have provided instruments and circuits which achieve all the objects of my invention and are well adapted to meet the conditions of practical use.

As various possible embodiments might be made in the above invention, and as various changes might be made in the embodiments above set forth, it is to be understood that all matter herein described or shown in the accompanying drawings is to be interpreted as illustrative and not in a limiting sense.

Having thus described my invention, I claim as new and desire to secure by Letters Patent:

1. An electric instrument for indicating in the vicinity of a thermistor a change from gaseous to liquid state or a change from static condition to a predetermined velocity of flow of a fluid medium: said instrument comprising a thermistor adapted to be located in the fluid medium and to operate at a temperature higher than the temperature of the medium, means to pass current through the thermistor whereby a change in condition or state of the fluid medium produces a change in the voltage drop across the thermistor, means including a fixed resistance in series with the thermistor and having an ohmic value many times that of the thermistor under ordinary working conditions to maintain the current flow through the thermistor substantially constant whereby the voltage drop across the thermistor is rendered substantially insensitive to temperature changes in the fluid medium over a wide temperature range, and a voltage sensitive device controlled by the voltage drop across the thermistor, said device having a predetermined threshold operating voltage above that developed across the thermistor by said current when the thermistor is in a static fluid medium or in a gaseous medium within said wide temperature range, whereby the instrument is insensitive to temperature in said range, said device operating upon a change in condition which produces a voltage in excess of the threshold voltage.

2. An electric instrument as set forth in claim 1 wherein the voltage sensitive device is a relay.

3. An electric instrument as set forth in claim 1 wherein the voltage sensitive device is a signalling means.

4. An electric instrument as set forth in claim 1 wherein the voltage sensitive device is connected directly across the thermistor.

5. An electric instrument as set forth in claim 1 wherein a second resistance is provided and wherein means is included which is controlled by the voltage sensitive device to insert the second resistance in series with the thermistor across the voltage sensitive device when the voltage sensitive device is actuated.

6. An electric instrument for indicating in the vicinity of a thermistor a change from gaseous to liquid state or a change from static condition to a predetermined velocity of flow of a fluid medium: said instrument comprising a thermistor adapted to be located in the fluid medium and to operate at a temperature higher than the temperature of the medium, means to pass current through the thermistor whereby a change in condition or state of the fluid medium produces a change in the voltage drop across the thermistor, means including a fixed resistance in series with the thermistor and having an ohmic value at least eight times that of the thermistor under ordinary working conditions to maintain the current flow through the thermistor substantially constant whereby the voltage drop across the thermistor is rendered substantially insensitive to temperature changes in the fluid medium over a wide temperature range, and a voltage sensitive device controlled by the voltage drop across the thermistor, said device having a predetermined threshold operating voltage above that developed across the thermistor by said current when the thermistor is in a static fluid medium or in a gaseous medium within said wide temperature range, whereby the instrument is insensitive to temperature in said range, said device operating upon a change in condition which produces a voltage in excess of the threshold voltage.

7. An electric instrument for indicating in the vicinity of a thermistor a change from gaseous to liquid state or a change from static condition to a predetermined velocity of flow of a fluid medium: said instrument comprising a thermistor adapted to be located in the fluid medium and to operate at a temperature higher than the temperature of the medium, means to pass a substantially constant current through the thermistor whereby a change in condition or state of the fluid medium produces a change in the voltage drop across the thermistor, the voltage drop across the thermistor is rendered substantially insensitive to temperature changes in the fluid medium over a wide temperature range, and a voltage sensitive device controlled by the voltage drop across the thermistor, said device having a predetermined threshold operating voltage above that developed across the thermistor by said current when the thermistor is in a static fluid medium or in a gaseous medium within said wide temperature range, whereby the instrument is insensitive to temperature in said range, said device operating upon a change in condition which produces a voltage in excess of the threshold voltage.

References Cited in the file of this patent

UNITED STATES PATENTS

| | | |
|---|---|---|
| 2,021,491 | Ruben | Nov. 19, 1935 |
| 2,307,576 | De Croce | Jan. 5, 1943 |
| 2,359,334 | Smith | Oct. 3, 1944 |
| 2,468,676 | Liben | Apr. 26, 1949 |
| 2,482,820 | Wolfson | Sept. 27, 1949 |
| 2,533,286 | Schmitt | Dec. 12, 1950 |
| 2,543,588 | Nelson | Feb. 27, 1951 |
| 2,580,182 | Morgan et al. | Dec. 25, 1951 |

FOREIGN PATENTS

| | | |
|---|---|---|
| 673,143 | Great Britain | June 4, 1952 |